United States Patent [19]

Lorenz et al.

[11] Patent Number: 4,574,744
[45] Date of Patent: Mar. 11, 1986

[54] WASTE HEAT BOILER SYSTEM, AND METHOD OF GENERATING SUPERHEATED HIGH PRESSURE STEAM

[75] Inventors: Kurt Lorenz, Hattingen; Horst Dungs, Herne; Gerd Nashan, Oberhausen; Dieter Breidenbach, Waltrop; Josef Volmark, Bochum, all of Fed. Rep. of Germany

[73] Assignee: Firma Carl Still GmbH & Co. KG, Fed. Rep. of Germany

[21] Appl. No.: 683,935

[22] Filed: Dec. 20, 1984

[30] Foreign Application Priority Data

Dec. 23, 1983 [DE] Fed. Rep. of Germany ....... 3346618

[51] Int. Cl.4 ............................................. F22D 1/00
[52] U.S. Cl. .................................... 122/7 R; 432/90; 122/5; 110/234
[58] Field of Search ................ 122/7 R, 5; 432/90, 432/92, 89; 110/234

[56] References Cited

U.S. PATENT DOCUMENTS

| | | | |
|---|---|---|---|
| 1,467,957 | 9/1923 | Snyder | 122/5 R |
| 1,897,950 | 2/1933 | Battin et al. | 122/5 R |
| 3,795,987 | 3/1974 | Kemmetmueller | 432/90 |
| 3,848,344 | 11/1974 | Kemmetmueller | 432/90 |
| 4,351,275 | 9/1982 | Bhojwani et al. | 122/7 R |
| 4,354,438 | 10/1982 | Beckmann | 110/234 |
| 4,369,834 | 1/1983 | Meunier et al. | 122/7 R |
| 4,474,138 | 10/1984 | Remmers et al. | 122/7 R |
| 4,493,291 | 1/1985 | Zabelka | 122/5 |

FOREIGN PATENT DOCUMENTS 3007040 9/1981 Fed. Rep. of Germany.

*Primary Examiner*—Henry C. Yuen
*Attorney, Agent, or Firm*—McGlew and Tuttle

[57] ABSTRACT

A waste heat boiler system includes a vertically elongated waste heat boiler having an upper portion with a waste gas inlet and a lower portion with an exhaust line connection which in addition to its vapor generating tubes includes evaporator tube nests and a water preheater. The waste gases are received from a dry coke cooling vessel and they are delivered through a separator by a blower to the lower end of the coke cooling vessel for flow upwardly through the hot coke. The superheater is mounted over the waste heat boiler and has a connection through a controllable valve to the top of the waste heat boiler. The superheater includes its own burner and air and external gas supply are supplied to the combustion chamber for the superheater along with bypass portion of the circulated waste gases. The steam generated by the boiler is delivered from a steam cylinder or drum in the superheated tubes of the superheater. Some of the gases from the superheater are selectively delivered to the waste heat boiler and some are discharged through atmosphere.

4 Claims, 1 Drawing Figure

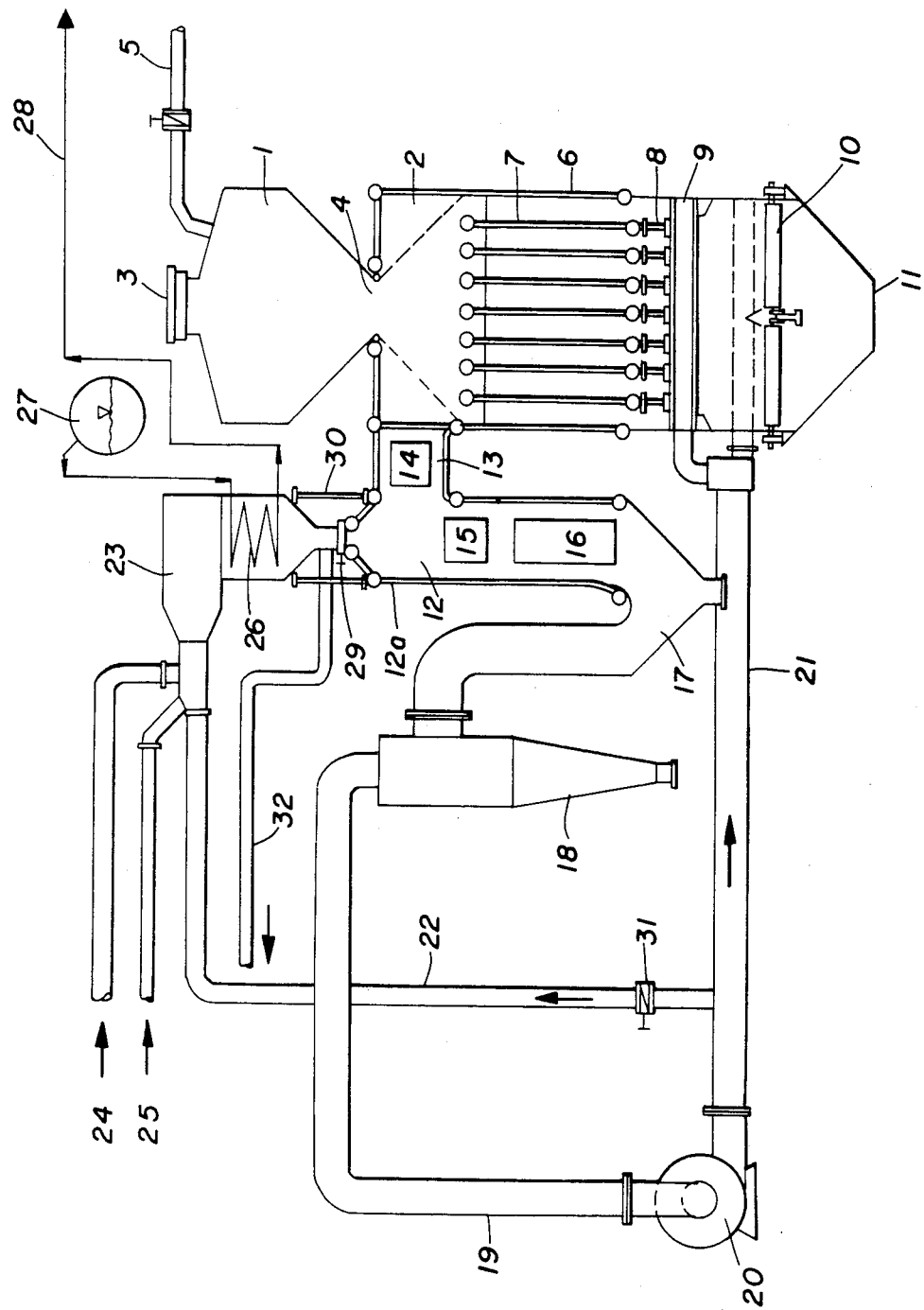

WASTE HEAT BOILER SYSTEM, AND METHOD OF GENERATING SUPERHEATED HIGH PRESSURE STEAM

FIELD AND BACKGROUND OF THE INVENTION

This invention relates in general to coking devices and in particular to a new and useful apparatus for generating superheated high pressure steam during a dry process of cooling the coke and to an apparatus for carrying out the method.

A method and apparatus for dry cooling incandescent coke are known from German patent application No. P 3332702. In this prior art method, the heat from the hot coke is partly transferred in the cooling chamber to a circulated cooling gas and used in a following waste heat boiler and, through a heat exchanger, for generating superheatd high-pressure steam. The usual superheater, evaporator, and feed water preheater are provided in the waste heat boiler and connected in series. Experience has shown that the tubes in the superheater are exposed to extreme conditions. On their outside, they are in contact with the hot circulated gases having a temperature in excess of 1,000° C., and inside, they are in contact with the superheated steam flowing therethrough. Also, the reducing atmosphere of the circulating hot gas require very expensive materials which must withstand these extreme temperature as well as high pressures and very corrosive gases.

German OS No. 3007040 discloses a method and apparatus for utilizing the sensible heat of coke in a dry cooling process with a circulated inert gas, where the hot circulated gas is directed from the cooling chamber, upstream of the boiler-heat exchanger system, through a combustion chamber into which a fuel gas and an oxygen containing gas, such as combustion air, are introducible. This additional combustion chamber is intended to ensure a continuous steam generation, if irregularities in the hot coke supply occur. In normal operation of the plant, the entire amount of circulating hot gas is directed above into the boiler-exchanger system, and the gas first contacts the coils of the superheater.

SUMMARY OF THE INVENTION

The invention is directed to a method and apparatus avoiding an excessive exposure of the superheater tubes and thus making it possible to make these tubes of less expensive materials and to ensure a safer operation.

In accordance with the invention a waste heat boiler is connected to the upper end of a vessel in which coke is cooled by the circulation of gases upwardly therethrough which are delivered to a waste heat boiler for the generation of steam. In accordance with the invention, the steam which is generated is delivered to a separate superheater which has its own combustion device which is partly supplied with gas from the dry coke process and with its separate air supply and which in accordance with the invention is connected to the waste heat boiler.

Removing the steam superheating equipment from the normal circuit of the hot cooling gas makes it possible to keep the superheater tubes permanently in an oxidizing atmosphere and thus to emply much less expensive materials for the tubes. It has been found that only a small part of the total amount of heat contained in the hot cooling gas is needed for superheating the steam. This needed heat can be obtained, in accordance with the invention, simply in a separate combustion chamber operated with an inexpensive fuel gas separately obtained from the coking plant. To utilize the heat of the hot waste gases of the superheater, the invention provides that the gases are directly supplied to the hot part of the waste heat boiler.

Since considerable amounts of a combustible gas may be contained in the hot cooling gas also, it has been found advantageous to operate the combustion chamber of the superheater, in accordance with the invention, entirely or partly with a partial stream of the circulated cooling gas of the dry cooling plant. Due to the simultaneous introduction of the oxygen containing gases, such as combustion air, the residual combustible gases of the circulated gas are burned too.

Instead of directing into the combustion chamber a partial stream of hot gas circulated close downstream of the cooling chamber, it may be provided, in accordance with the invention, to take the gas for the combustion chamber of the superheater after its cooling down in the waste heat boiler, namely downstream of the blower. A precompressed gas free from solid particles is thus supplied to the combustion chamber. By admixing a suitable amount of combustion air or additional combustible gas, a definite temperature of the gases passing through the superheater may be obtained. This may also eliminate an undesirable excessive superheating of the steam. In any case, an overloading of the superheater tubes is thereby prevented.

More particularly, due to the invention, the temperature of the steam can attain 280° C. to 600° C., so that a high quality superheated steam for a great variety of purposes is obtained.

The apparatus of the invention includes in addition to the vessel for cooling the coke which includes tubes for circulating a liquid therethrough, a separate waste heat boiler that generates steam which is delivered to a steam cylinder connected to a separate superheater which is separately fired.

The superheated tubes are no longer exposed to the hot cooling gas stream, they remain only in contact with hot waste gases from the combustion chamber. Due to the mounting of the combustion chamber and the superheater directly above the waste heat boiler, a simple and rugged structure of the entire plant is obtained requiring no larger changes in the waste heat boiler, the steam lines, and the steam cylinder.

Accordingly, it is an object of the invention to provide a method of generating superheater high pressure steam during a dry process of cooling coke wherein the cooling gas which is circulated through the coke is passed through a waste heat boiler which generates steam and this steam is delivered to a separate superheater having its own combustion chamber which is selectively connected to discharge its generating gases into the waste heat boiler.

A further object of the invention is to provide an apparatus for generating superheater high pressure steam which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE of the drawing is a schematic showing of the waste heat boiler system for cooling coke constructed in accordance with the invention.

DESCRIPTION OF THE PREFERRED EMBODIMENT

Referring to the drawing in particular, the invention embodied therein comprises a waste heat boiler system which includes a vertically elongated boiler 12 having an upper portion with a waste gas inlet 13 which receives gases which are circulated through hot coke in cooling vessel 2. The waste heat boiler includes a lower portion having an exhaust connection 17 which connects through a fine dust separator 18 and a blower 20 for recirculating the gases through a line 21 back to the lower end of the vessel 2. In accordance with the invention, a superheater 26 is mounted over the waste heat boiler 12 and has a connection through a valve 29 to the upper end of the wast heat boiler 12. Superheater 26 is heated by a separate burner and combustion chamber 23 which receives air through a line 24 and an external combustible gas through a line 25 as well as a portion of the cooling gases which are circulated backwardly from the line 21 through a control valve 31 and a connecting line 22 to the combustion chamber 23.

In a manner known per se, the red-hot coke is brought in buckets from the coke oven chamber to the cooling plant and charged through an opening 3 into an antechamber 1. Therefrom, the hot coke passes through an opening 4 into the cooling chamber proper 2 to transfer its heat partly to the inner and outer cooling walls 6,7 and partly to a gas circulated therethrough. Inner cooling walls rest on supports 8 which in turn are partly supported on a cooling gas supply duct 9. The cooled coke is is removed at the bottom of the cooling chamber 2, through tipping dischargers 10 and coke outlet 11. The hot cooling gas is directed at the upper end of cooling chamber 2 through a connecting line 13 to a waste heat boiler 12 having outer cooling walls 12a.

The waste heat boiler accommodates evaporator tube nests 14 and 15 and a feed water preheater 16. Beneath waste heat boiler 12, a fine dust discharge duct 17 is provided. Upon leaving the waste heat boiler, the cooling gases are directed through a fine dust separator 18 and through lines 19, a blower 20, and a cooling gas supply line 21 to the lower end of the cooling chamber.

A partial stream of cooled cooling gas can be passed off cooling gas supply line 21 downstream of blower 20 and directed through a line 22 to a combustion chamber 23 of a superheater 26. Combustion chamber 23 is supplied with combustion air and extraneous gas through lines 24 and 25. The hot combustion gas from the combustion chamber passes directly through superheater 26 and therefrom to the head of waste heat boiler. The outlets of the superheater and of the waste heat boiler are connected to each other through a control valve and a shutoff valve 29. While throttling or completely shutting of the passage, the waste gases are exhausted partly or completely to the free atmosphere through a line 32. The combustion chamber and superheater unit is supported through a beam 30 directly on the waste heat boiler.

The high-pressure saturated steam produced in the waste heat boiler 12, 12a and in cooling walls 6 and 7 of the cooling chamber 2 passes into a steam cylinder or drum 27 wherefrom it is directed to superheater 26 for superheating, and is available for further use as superheated high-pressure steam in a line 28.

While a specific embodiment of the invention has been shown and described in detail to illustrate the application of the principles of the invention, it will be understood that the invention may be embodied otherwise without departing from such principles.

What is claimed is:

1. A waste heat boiler system associated with dry process of cooling coke using cooling gases in a dry coke cooling vessel, comprising a vertically elongated waste heat boiler having vapor generating tubes and an upper portion with an inlet from the dry coke cooling vessel for receiving gases which are heated by the cooling of the coke in the vessel, said waste heat boiler having a lower portion with an exhaust line connection, said dry coke cooling vessel having an upper connection connected to said inlet of said waste heat boiler and a lower inlet for cooling gases and means for circulating exhaust gases from said exhaust line connection of said waste heat boiler back to said lower inlet of said cooling vessel for circulating the gases through hot coke in said vessel, a superheater mounted over said waste heat boiler and having a connection to said waste heat boiler, a valve in said superheater connection for controlling a flow of gases from said superheater to said upper portion of said boiler, a separate combustion chamber having its own burner associated with said superheater, and means for supplying air and a portion of the exhaust gases to said combustion chamber burner.

2. A waste heat boiler system according to claim 1, wherein said means for circulating exhaust gases comprises a fine dust separator connected to said exhaust line connection of said waste heat boiler for receiving exhaust gases therefrom, a blower connected to said fine dust separator for receiving exhaust gases from said fine dust separator, and a return line connected between said blower and said lower inlet of said vessel, said means for supplying air and a portion of the exhaust gases to said combustion chamber burner comprising a branch line connected between said return line and said combustion chamber burner, and a further valve in said branch line for controlling a flow of exhaust gases from said return line to said burner.

3. A waste heat boiler system according to claim 2, wherein said superheater includes an outlet line connected upstream of said first-mentioned valve for venting gases from said superheater which do not flow to said upper portion of said boiler.

4. A waste heat boiler system according to claim 3, including a steam drum connected to said superheater for supplying saturated steam thereto, said dry coke cooling vessel and said waste heat boiler including cooling walls having tubes through which cooling water flows for cooling coke in said vessel and exhaust gases in said boiler, said tubes being connected to said steam drum for supplying said steam drum.

\* \* \* \* \*